(12) United States Patent
Bontu et al.

(10) Patent No.: US 8,755,791 B2
(45) Date of Patent: Jun. 17, 2014

(54) METHOD AND SYSTEM FOR LOW POWER DOWNLINK TRANSMISSION IN HETEROGENEOUS NETWORKS

(75) Inventors: Chandra Sekhar Bontu, Nepean (CA); Yi Song, Plano, TX (US); Zhijun Cai, Euless, TX (US)

(73) Assignee: BlackBerry Limited, Waterloo (CA)

( * ) Notice: Subject to any disclaimer, the term of this patent is extended or adjusted under 35 U.S.C. 154(b) by 126 days.

(21) Appl. No.: 13/470,009

(22) Filed: May 11, 2012

(65) Prior Publication Data

US 2013/0303153 A1 Nov. 14, 2013

(51) Int. Cl.
*H04W 24/00* (2009.01)

(52) U.S. Cl.
USPC ............ 455/423; 455/522; 375/344; 370/252

(58) Field of Classification Search
USPC .................... 455/423, 522; 370/252; 375/344
See application file for complete search history.

(56) References Cited

U.S. PATENT DOCUMENTS

| 2010/0325506 A1 | 12/2010 | Cai et al. |
| 2012/0113844 A1 | 5/2012 | Krishnamurthy |

FOREIGN PATENT DOCUMENTS

| WO | 2011053865 A2 | 5/2011 |
| WO | 2011130447 A1 | 10/2011 |
| WO | 2012045212 A1 | 4/2012 |
| WO | 2012154094 A1 | 11/2012 |

OTHER PUBLICATIONS

Notification of Transmittal of the International Search Report and the Written Opinion mailed on Jun. 24, 2013, in corresponding PCT Patent Application No. PCT/US2013/036218.
Extended European Search report mailed Mar. 21, 2013, in corresponding European patent application No. 12180074.2.
3GPP TR 36.814, "3rd Generation Partnership Project; Technical Specification group Radio Access Network; Evolved Universal Terrestrial Radio Access (E-UTRA); Further Advancements for E-UTRA, Physical Layer Aspects (Release 9)", Mar. 25, 2010.
3GPP TSG RAN WG1 #58bis, "Final Report of 3GPP TSG RAN WG1 #58 v1.0.0 (Shenzhen, China, Aug. 24-28, 2009)", R1-093746,from 3GPP TSG RAN WG1 Meeting #58bis held in Miyazaki, Japan Oct. 12-16, 2009.
3GPP TSG-RAN WG1 Meeting #59, R1-094461, "DL performance evaluation of Type-II relay", Research In Motion, UK Limited, Nov. 9-13, 2009, Jeju, Korea, R1-094461.
3GPP TSG-RAN WG1 #58, R1-093726, "Text proposal for channel model and evaluation methodology", CMCC, Aug. 24-28, 2009, Shenzhen, China; printed Aug. 28, 2009.

*Primary Examiner* — Charles Shedrick
(74) *Attorney, Agent, or Firm* — Novak Druce Connolly Bove + Quigg LLP

(57) ABSTRACT

A method and user equipment for providing channel quality indicator feedback, the method receiving, at the user equipment, a power offset value; measuring, at the user equipment, a channel quality indicator over a reference symbol resource element; and scaling, at the user equipment, the channel quality indicator using the power offset value during an almost blank subframe. Also, a method and network element for coordination between network nodes in a heterogeneous network, the method receiving, at a first network node, load information from at least one other network node; configuring an almost blank subframe (ABS) pattern and a power offset value based on the received load information; providing the power offset value to at least one other network node; and signalling at least one of the power offset value and an ABS threshold value to at least one user equipment.

26 Claims, 10 Drawing Sheets

METHOD AND SYSTEM FOR LOW POWER DOWNLINK TRANSMISSION IN HETEROGENEOUS NETWORKS

FIELD OF THE DISCLOSURE

The present disclosure relates to heterogeneous networks and in particular relates channel quality indicator reporting during almost blank subframes within heterogeneous networks.

BACKGROUND

Various mobile architectures include a macro cell having smaller cells found within these macro cells. These smaller cells, also referred to as low power nodes, such as relay nodes, pico cells, femto cells among others, can be used to improve the cell edge performance and increase average cell throughput. Pico cells and femto cells are basically evolved node Bs (eNBs) with low transmission power and are generally connected to a macro cell through a wired backhaul connection. Relay nodes are typically low-transmit power eNBs without a direct backhaul connection to the macro node.

UEs connected to network via a low power node such as pico cell or femto cell or relay node may be however, exposed to significant inter-cell interference. In order to manage inter-cell interference, one technique is to use an inter-cell interference coordination (ICIC) technique, also called an almost blank subframe (ABS). The ABS occurs in some heterogeneous deployments where a cluster of cells with large and small coverage areas co-exist in a geographical region. The ABS is a normal subframe where an average transmit power of the physical downlink shared channel (PDSCH) physical resource bearer (PRB) is set to a very low power. The average transmit power during the ABS transmission is set by the eNB.

According to the Third Generation Partnership Project (3GPP), Long Term Evolution (LTE) Release 10 specifications, a UE can be configured by the network to send a separate channel quality indicator (CQI) feedback for ABS and non-ABS transmissions.

BRIEF DESCRIPTION OF THE DRAWINGS

The present disclosure will be better understood with reference to the drawings, in which.

DETAILED DESCRIPTION OF THE DRAWINGS

Figure 1:
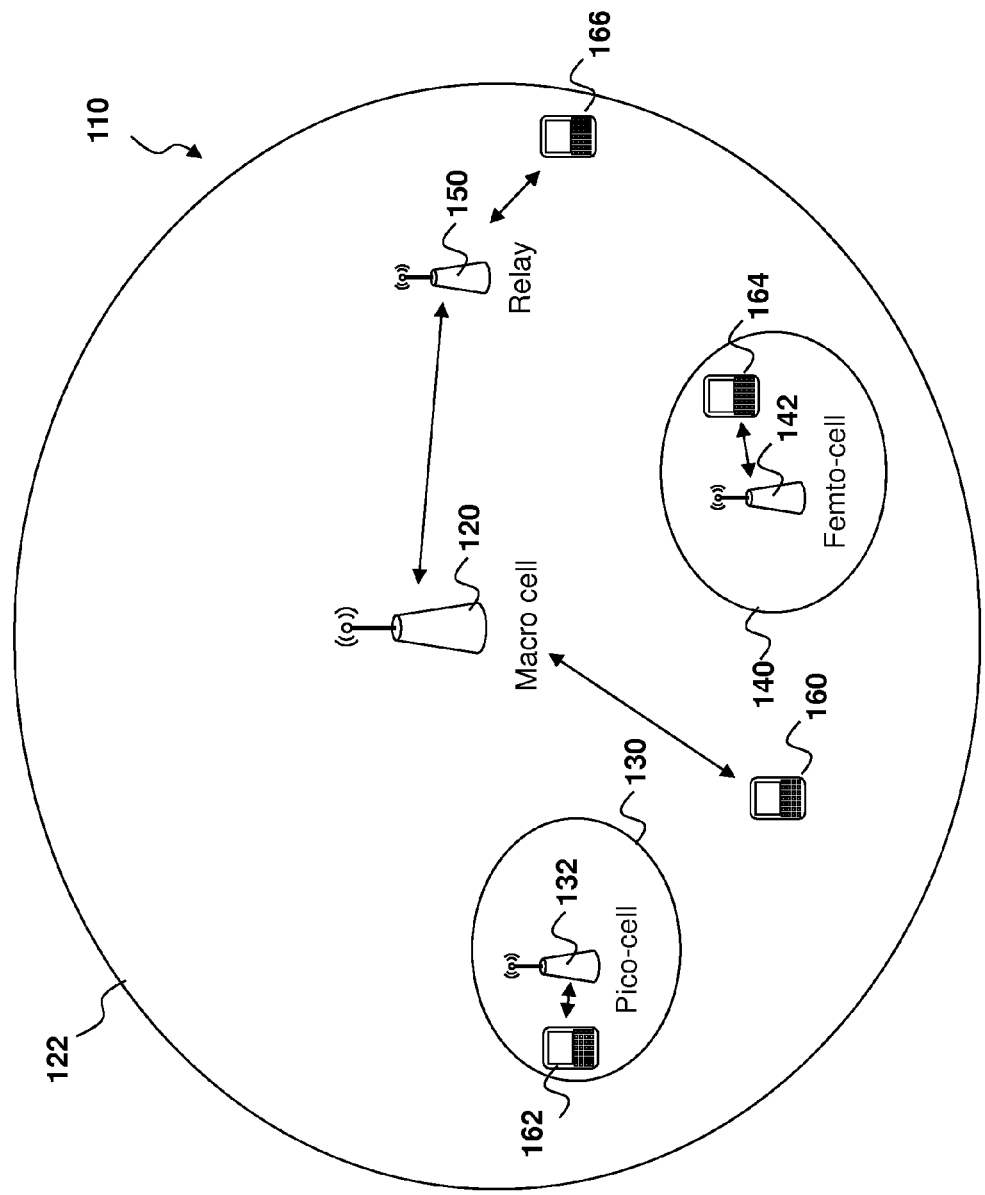
FIG. 1 is a block diagram of an exemplary heterogeneous network.

The present disclosure provides a method for providing channel quality indicator feedback from a user equipment, comprising: receiving, at the user equipment, a power offset value; measuring, at the user equipment, a channel quality indicator over a reference symbol resource element; and scaling, at the user equipment, the channel quality indicator using the power offset value during an almost blank subframe.

The present disclosure further provides a user equipment for providing channel quality indicator feedback, comprising: a processor; and a communications subsystem, wherein the processor and communications subsystem are configured to: receive a power offset value; measure a channel quality indicator over a reference symbol resource element; and scale the channel quality indicator using the power offset value during an almost blank subframe.

The present disclosure further provides a method for determining an almost blank subframe at a user equipment connected to an aggressor cell, the method comprising: receiving, at the user equipment, a threshold value; and determining the almost blank subframe based on a comparison of the threshold value with a ratio of an average estimated received power from the aggressor cell for a reference symbol resource element and the average estimated received power from the aggressor cell for a data resource element.

The present disclosure further provides a user equipment connected to an aggressor cell for determining an almost blank subframe, comprising: a processor; and a communications subsystem, wherein the processor and communications subsystem are configured to: receive a threshold value; and determine the almost blank subframe based on a comparison of the threshold value with a ratio of an average estimated received power from the aggressor cell for a reference symbol resource element and the average estimated received power from the aggressor cell for a data resource element.

The present disclosure further provides a method for determining an almost blank subframe of an aggressor cell at a user equipment connected to a victim cell, the method comprising: receiving, at the user equipment, a threshold value; measuring the average inter-cell interference level over a subframe; and determining the almost blank subframe (ABS) based on a comparison of the threshold value with an absolute difference between an average estimated inter-cell interference power measured over the reference symbol resource element in a subframe and the average estimated inter-cell interference power measured over the reference symbol resource element in a previous subframe.

The present disclosure further provides a user equipment connected to a victim cell for determining an almost blank subframe of an aggressor cell, comprising: a processor; and a communications subsystem, wherein the processor and communications subsystem are configured to: receive a threshold value; measure the average inter-cell interference level over a subframe; and determine the almost blank subframe (ABS) based on a comparison of the threshold value with an absolute difference between an average estimated inter-cell interference power measured over the reference symbol resource element in a subframe and the average estimated inter-cell interference power measured over the reference symbol resource element in a previous subframe.

The present disclosure further provides a method for coordination between network nodes in a heterogeneous network, comprising: receiving, at a first network node, load information from at least one other network node; configuring, at the first network node, an almost blank subframe (ABS) pattern and a power offset value based on the received load information; providing the power offset value to at least one other network node; and signalling at least one of the power offset value and an ABS threshold value to at least one user equipment.

The present disclosure further provides a network node configured for coordination between network nodes in a heterogeneous network, comprising: a processor; and a communications subsystem, wherein the processor and communications subsystem are configured to: receive load information from at least one other network node; configure an almost blank subframe (ABS) pattern and a power offset value based on the received load information; provide the power offset value to at least one other network node; and signal at least one of the power offset value and an ABS threshold value to at least one user equipment.

Reference is now made to FIG. 1, which shows an example environment 110 for the use of various small cell and macro cell networks. Specifically, the approach of FIG. 1 shows pico cells, femto cells and relay nodes positioned around a macro cell edge, where a user equipment (UE) can access the smaller cells at a higher data rate or lower power consumption. The smaller cells can also be used to offload traffic from the macro cell.

In the approach of FIG. 1, a macro eNB 120 has a coverage area shown by circle 122. In order to improve coverage and data throughput, and/or to offload some UEs, various low power nodes may be introduced. In the example of FIG. 1, a pico cell 130 having a pico cell eNB 132 is shown.

Similarly, a femto cell 140 having a femto cell Home eNB (HeNB) 142 is also shown. Further, a relay 150 is shown. A remote radio head (RRH) could also be used, but is not shown in the approach of FIG. 1.

Areas 122, 130 and 140 represent target cell coverage. Target cell coverage of a macro eNB is for an initial deployment while the pico/femto eNBs can be added as needed to offer outdoor coverage and capacity increase in dense user areas such as hot spots, among others.

In addition, relay nodes can be employed for cost effective throughput enhancement and for coverage extension.

In one approach of the present disclosure, the pico, femto, relay, remote radio heads, as well as the related nodes, are designed to have a lower maximum transmit power than the macro eNB and therefore the downlink limited cell coverage from these eNBs or nodes is correspondingly smaller.

Various user equipments (UEs) are also shown in FIG. 1. For example, UE 160 is serviced by macro eNB 120. UE 162 is serviced by pico cell eNB 132. UE 164 is serviced by femto cell eNB 142. UE 166 is serviced by relay 150.

The use of a smaller cell within the macro area can lead to interference. For example, a UE near the edge of pico cell 130, or within a range expansion area for pico cell 130, will see significant interference from macro cell 120. Similarly, if femto-cell 142 is a closed subscriber group cell, meaning that only those UEs subscribed to femto-cell 142 can connect to it, non-member UEs serviced by macro cell 120 will see significant interference from femto cell 142 while in area 140. The term aggressor cell is used herein to define a cell that causes interference, and can for example be a macro cell in a macro-pico scenario, or a closed subscriber femto cell in a femto-macro or femto-femto or femto-pico scenario. The term victim cell is used to define a cell whose downlink (DL) transmissions are interfered by the aggressor cell, and can for example be a pico cell in a macro-pico scenario, or a macro or pico cell in a femto-macro or femto-femto or femto-pico scenario.

In heterogeneous network deployment, inter-cell interference coordination (ICIC) plays an important role and time domain based resource sharing or coordination has been provided as an enhanced ICIC (eICIC). The eICIC is also known as an Almost Blank Subframe (ABS) based solution. In such an ABS based solution, a dominant cell will transmit almost no information in certain subframes.

There are two main deployment scenarios where eICIC is utilized. These include the closed subscriber group (femto cell) scenario and the pico cell scenario.

Figure 2:
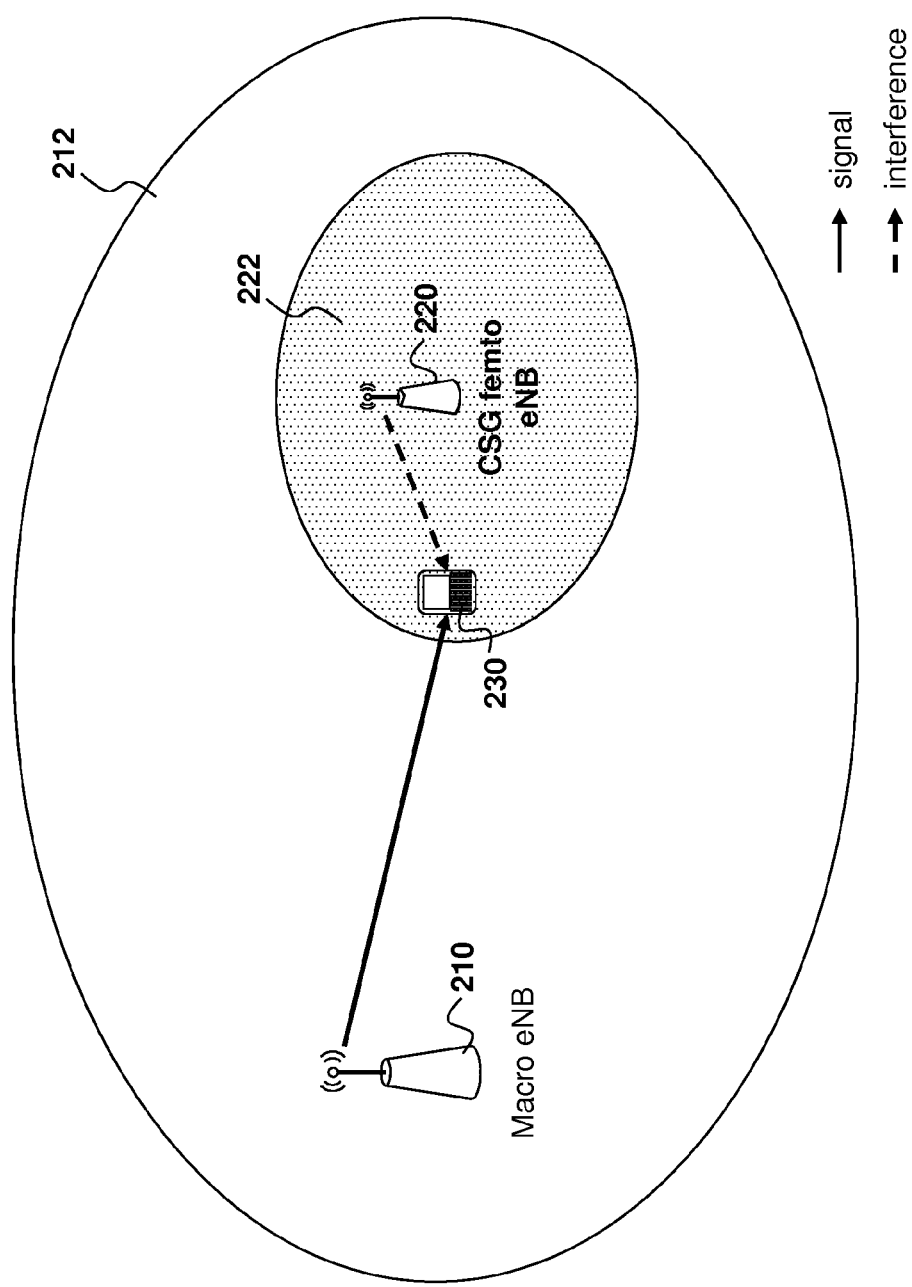
FIG. 2 is a block diagram illustrating a heterogeneous network having a closed subscriber group cell within a macro cell.

Reference is now made to FIG. 2, which shows the closed subscriber group scenario. In FIG. 2, macro eNB 210 has a cell coverage area shown by circle 212.

Similarly, closed subscriber group (CSG) cell 220 has a coverage area shown by circle 222.

A non-member UE 230 enters into the CSG coverage area 222. However, since UE 230 is not a member of CSG cell 220, UE 230 cannot connect to CSG cell 220 must continue to be served by macro cell 210. In this case, the CSG cell is dominant (aggressor cell) and has a stronger signal power than that of macro cell 210 and the signals from CSG cell 220 are seen as interference at UE 230.

That is, according to FIG. 2, dominant interference conditions may happen when non-member users are in close proximity of a CSG cell 220. Typically, the Physical Downlink Control Channel (PDCCH) reception at the non-member UE is interfered by the downlink transmission from the CSG cell 220 to its member UEs. Interference to the PDCCH reception of the macro cell UE 230 has a detrimental impact on both the uplink and downlink data transfer between the UE and the macro eNB 210. In addition, other downlink control channels and reference signals from both the macro eNB 210 and neighbor cells that may be used for cell measurements and radio link monitoring are also interfered by the downlink transmission from the CSG cell 220 to its member UEs.

Depending on network deployment and strategy, it may not be possible to divert the users suffering from inter-cell interference to another E-UTRA carrier or other radio access technology (RAT). In this case, time domain ICIC may be used to allow such non-member UEs to remain served by the macro cell on the same frequency layer. Such interference may be mitigated by the CSG cell utilizing Almost Blank Subframes (ABS) to protect the protected resources for radio resource measurement (RRM), radio link monitoring (RLM) and Channel State Information (CSI) measurements for the serving macro eNB 210, allowing the UE to continue to be served by the macro eNB under otherwise strong interference from the CSG cell.

Figure 3:
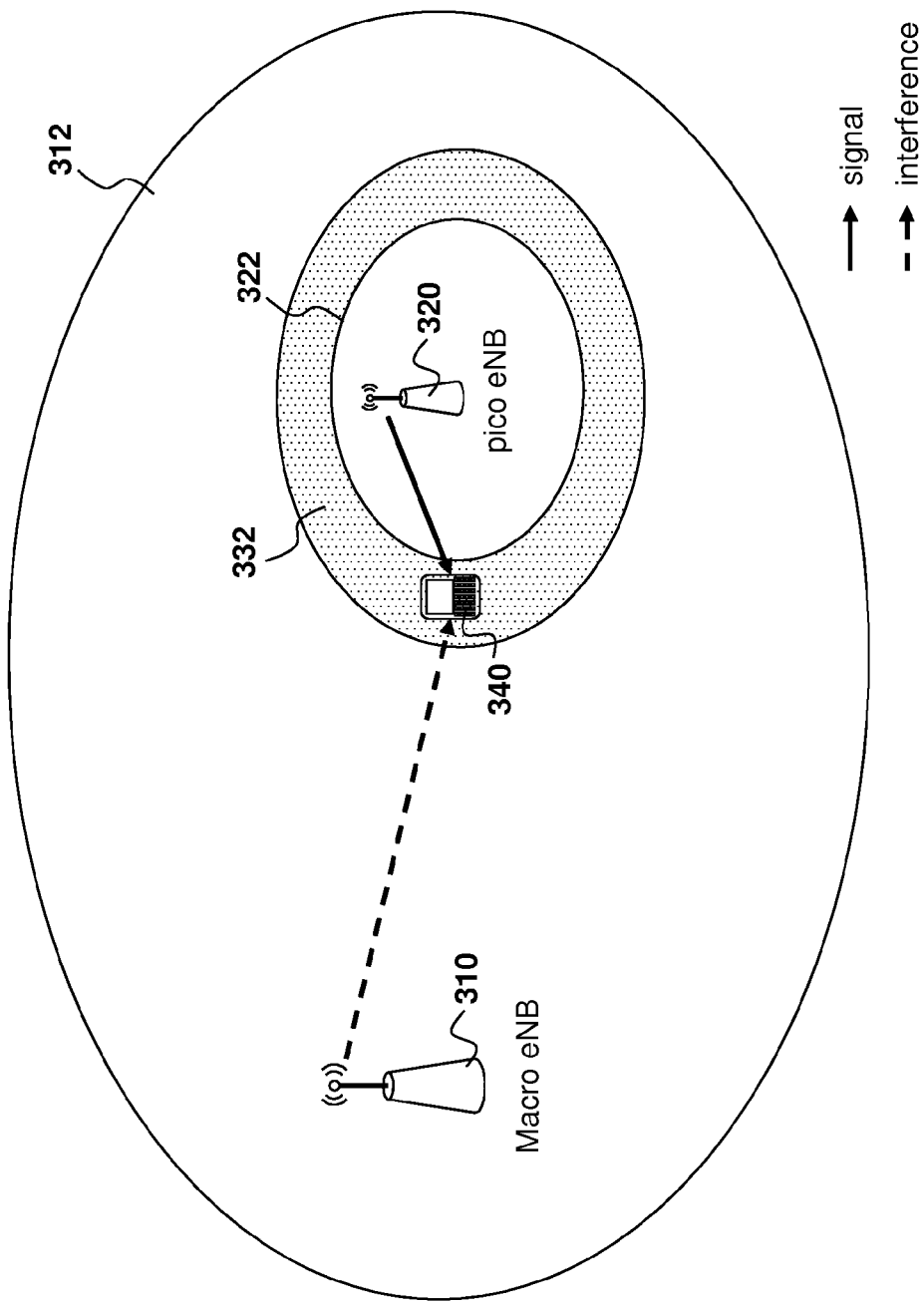
FIG. 3 is a block diagram illustrating a heterogeneous network having a pico cell within a macro cell.

Similarly, for a pico scenario, reference is made to FIG. 3. In FIG. 3, macro eNB 310 has a cell coverage area shown by circle 312. Similarly, a pico cell 320 has a coverage area shown by circle 322. Pico cell 320 may further include a range expansion area 332 used for increasing the coverage area or traffic offloading for pico cell 320.

A UE 340 is served by pico cell 320, but it is close to the edge of the pico cell coverage or in range expansion area 332 of the pico cell 320. In this case, macro eNB 310 may generate/cause significant interference for the UE 340.

In particular, the time domain ICIC may be utilized for a pico cell 320, for users who are served in the edge of the serving pico cell. This scenario may be used, for example, for traffic offloading from a macro eNB 310 to the pico cell 320. Typically, the Physical Downlink Control Channel transmitted by the pico cell is interfered by the downlink transmission from the macro cell. In addition, other downlink control channels and reference signals, from both the pico cell 320 and from neighbor pico cells, which may be used for cell measurements and radio link monitoring, are also interfered with by the downlink transmission from the macro cell.

Time domain ICIC may be utilized to allow such UEs to remain served by the pico cell 320 at an extended range on the same frequency layer. Such interference may be mitigated by the macro cell using an ABS to protect the corresponding pico cell's subframes from the interference. A UE 340 served by a pico cell 320 uses the protected resources during the macro cell ABS.

In both the FIG. 2 and FIG. 3 scenarios, for the ICIC, subframe utilization across different cells are coordinated in time through backhaul signaling or operations, administration and maintenance (OAM) to configure the Almost Blank Subframe patterns. The Almost Blank Subframes in an aggressor cell are used to protect resources in subframes in the victim cell receiving strong inter-cell interference from the aggressor cell.

Almost Blank Subframes are subframes with reduced transmit power and having no activity or reduced activity on some physical channels. However, in order to support backward compatibility for the legacy UEs, the eNB may still transmit some required physical channels in an ABS, including cell specific reference symbols, paging channels and synchronization signals as well as System Information.

Figure 4:
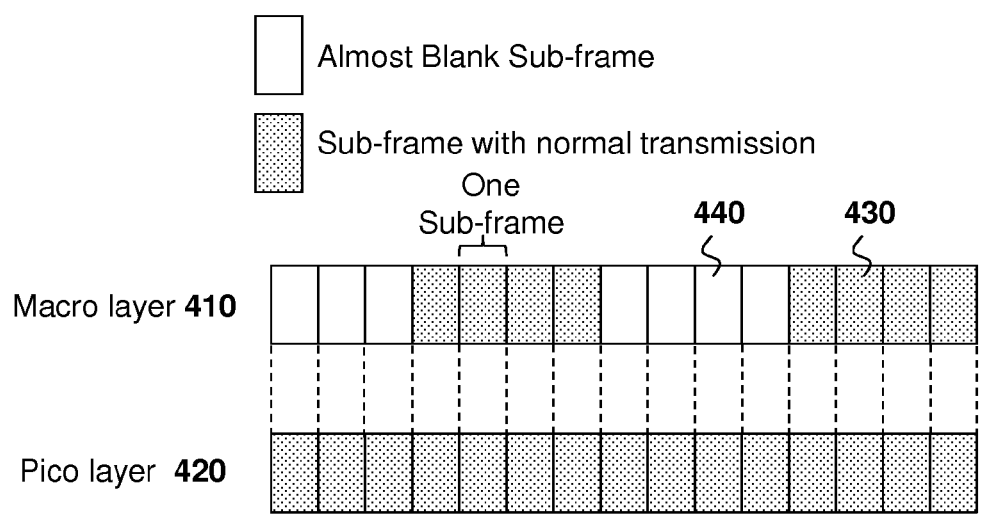
FIG. 4 is a block diagram showing subframe transmission at a macro layer and at a pico layer where the macro layer includes almost blank subframes.

An example of the ABS for pico scenario is shown with regards to FIG. 4. In FIG. 4, the macro layer 410 is the aggressor cell and pico layer 420 is the cell that has been interfered with. As seen in the example of FIG. 4, pico layer 420 transmits subframes with normal transmissions 430, as does macro layer 410. However, macro layer 410 also includes Almost Blank Subframes 440. Pico layer 420 may, when macro layer 410 is transmitting normal frames, schedule only UEs close to the pico cell during these subframes. However, during the Almost Blank Subframes transmissions, the pico layer 420 may transmit to UEs close to the cell edge or in the range expansion area.

CQI Reporting

When ABS is used, according to the 3GPP LTE release 10 specifications, a UE can send separate CQI feedbacks for ABS and for non-ABS transmissions. The reporting can be configured by the network for both a UE connected to an aggressor cell, as well as a UE connected to a victim cell that is subject to ABS from an aggressor cell.

The average power per resource element (RE) within a specific physical resource block (PRB), designated as "j", is set as follows ($P_{RSRE}$ is the average transmit power of the reference symbol resource element):

$$P_{DRE}(j) = \begin{cases} \rho_A(j)P_{RSRE} & \text{if } RE \text{ is in a } OFDM \text{ symbol with } RSRE \\ \rho_B(j)P_{RSRE} & \text{Otherwise} \end{cases} \quad (1)$$

Where $\rho_A \in \{0.25, 0.3334, 0.5, 0.6667, 1, 1.2589, 1.5849, 2.0\}$, $\rho_B = P_B \rho_A$, and $$P_B \in \begin{cases} [1, 0.8, 0.6, 0.4] & \text{for one antenna port} \\ [1.25, 1, 0.75, 0.5] & \text{for two and four antenna ports} \end{cases}$$

In the above, $\rho_A(j)$ is the transmit power scaling factor for the jth PRB and is decided based on the UE to which it is assigned to. $P_B$ is cell specific and $\rho_A$ is UE specific.

A UE estimates the channel quality indicator or the signal to interference noise ratio (SINR) over the received reference symbol resource elements (RSREs) over the jth PRB of the ith subframe, $\gamma_{RSRE,i,j}$ and scales the CQI based on the $\rho_A$ value received in the RRC Connection setup; RRC Connection Reestablishment; or RRC Connection Reconfiguration messages and the $P_B$ value provided in the system information block 2 (SIB-2) or included as part of the mobility control information element within the RRC Connection Reconfiguration message. For example, for an eNB with two transmit antennas operating over a channel bandwidth of 10 MHz when 3 orthogonal frequency division multiplexing (OFDM) symbols are dedicated for downlink control channels, the UE may scale $\gamma_{RSRE,i,j}$ as follows:

$$\gamma_{i,j} = \frac{(3\rho_A + \rho_B)}{4}\gamma_{RSRE,i,j} \quad (2)$$

The filtered value of the SINR can be calculated across multiple subframes after filtering in accordance with Equation 3 below.

$$\Gamma_{i,j} = \alpha\gamma_{i,j} + (1-\alpha)\Gamma_{i-1,j} \quad (3)$$

In Equation 3 above, $\alpha$ is the layer-3 filtering coefficient.

While equations 1 to 3 relate to CQI reporting in general, a UE that is connected to a macro cell may report a separate CQI for ABS and non-ABS subframes. Similarly, a second UE that is connected to a pico cell also may send two separate CQI reports, one when the subframe transmission from the pico is concurrent with a non-ABS transmission from the macro cell and the other where the subframe transmission is concurrent with the ABS transmission.

In one aspect of the present disclosure, UEs connected to a macro cell or a pico cell may need to distinguish between ABS and non-ABS subframes.

In accordance with one approach of the present disclosure, a procedure is provided which involves measuring the CQI over the reference symbol resource element (RSRE) and scaling the CQI based on at least one parameter received from an eNB, and reporting the scaled CQI for ABS and non-ABS transmission from the aggressor cell separately.

In particular, when an aggressor eNB configures an ABS pattern as part of a eICIC, then filtering is performed separately over ABS and non-ABS subframes in accordance with equation 4 below:

$$\Gamma_{i,j} = \alpha\gamma_{i,j} + (1-\alpha)\Gamma_{i-1,j}$$

$$\Gamma_{i,j,ABS} = \alpha\gamma_{i,j,ABS} + (1-\alpha)\Gamma_{i-1,j,ABS} \quad (4)$$

However, to estimate $\gamma_{i,j,ABS}$, the transmission power scaling parameters $\rho_A$ and $\rho_B$ used during the ABS transmissions should be known to a UE. In other words, a UE that is connected to an LTE network through an aggressor cell, which configures ABS transmissions, should know the $\rho_A$ and $\rho_B$ values. Currently UEs that are connected to the macro cell or a femto cell may not be aware of the new low power transmission over the configured ABS subframes.

Further, UEs connected to either the pico cell or the macro cell should be aware of the specific subframes over which the CQI needs to be measured separately for feedback reporting. Currently, the eNB can send dedicated RRC signalling to indicate subframe patterns and indicate a set of subframes over which the UE has to measure the CQI. However, in a small cell deployment, where a small cell can be surrounded by more than one macro cell, there may be significant signalling overhead to send dedicated RRC messages to the UEs for different ABS configurations.

Further, when ABS subframes are transmitted at low transmit power, the transmit power may be adjusted based on range expansion values set at the low power node.

CQI Determination During ABS

In accordance with one approach of the present disclosure, an aggressor cell, being the cell that configures the ABS, may advertise a power offset value indicating a difference in average power levels of an ABS subframe when compared to a non-ABS subframe, or a difference in average power levels of a first subset of subframes when compared to a second subset of subframes. The first subset of subframes and the second subset of subframes may or may not overlap. Alternatively, the eNB may send a UE specific power offset value in a dedicated RRC message.

A UE measures the CQI over the RSRE and scales the resulting value based on the scaling parameters advertised or received over the dedicated RRC signalling.

Therefore, in accordance with one approach of the present disclosure, a cell specific parameter $P_B$ is kept unchanged and the scaling parameter $\rho_A$ can be scaled by a power offset value $\Delta_P$.

In this case, the CQI during an ABS subframe may be represented by equation 5.

$$\gamma_{i,j,ABS} = \frac{(3\rho'_A + \rho'_B)}{4} \gamma_{RSRE,i,j,ABS} \quad (5)$$

where $\rho'_A = \rho_A \Delta_P$ and $\rho'_B = \rho'_A P_B$.

Thus, the CQI during a non-ABS subframe is in accordance with equation 2 and the CQI during an ABS subframe is in accordance with equation 5.

In another approach, the network may signal a subset of subframes for the UE to measure the CQI. In the interim, the network may signal the $\Delta_P$ value associated with this subset of subframes. The UE may measure the CQI in accordance with equation 5. The network may also signal an indicator to the UE whether the $\Delta_P$ value may apply. In yet another approach, the network may signal multiple subsets of subframes for the UE to measure the CQI. In the mean time, the network may signal the $\Delta_P$ value associated with each subset of subframes. The UE may measure the CQI in accordance with equation 5 for each subset of subframes. The network may also signal an indicator to the UE for each subset of subframes, indicating whether the $\Delta_P$ value may apply. As used in the present disclosure, CQI is a general term for channel quality measurements, and it may include a precoding matrix indicator, rank indicator, channel quality indicator, and other types of channel quality measurements (even radio resource measurements (RRM) indicators).

The $\Delta_P$ can be received by the UE as part of an information element through broadcast or dedicated RRC signaling. For example, a physical downlink shared channel (PDSCH) Configuration Common Information Element (IE) included in a system information block-2 (SIB-2) or as part of a mobility control IE in an RRC connection reconfiguration message.

The $\Delta_P$ may be defined to be within a range of $[\Delta_{P\_min}, \Delta_{P\_max}]$, where $\Delta_{P\_max} < 0.25$ and $\Delta_{P\_min}$ is decided by the UE receiver sensitivity, for example. $\Delta_{P\_max}$ be decided based on the minimum value of the existing $\rho_A$ parameter values.

$\Delta_P$ may be a serving cell design parameter and is decided based on range expansion values of the pico cell, for example.

If the $\Delta_P$ received by the UE in the SIB-2, one example of such signalling may be done through a PDSCH-ConfigCommon IE. Reference is made to Appendix A in which a modified PDSCH-ConfigCommon IE is provided. As shown in bold in Appendix A, a $\Delta_P$ value is provided. In the example of Appendix A, the $\Delta_P$ value is an integer value from 0 to 7 and may be associated with a plurality of values in a table to provide the scaling factor.

As further provided in Appendix A, the PDSCH-Config field descriptions are expanded to include the parameter delta-p.

Alternatively, $\Delta_P$ can be set as a UE specific parameter and included in the PDSCH-ConfigDedicated IE in the RRC message. This may be advantageous in cases where a wide range of downlink transmit power settings are possible during low power ABS transmissions. In this case, example changes to an existing PDSCH-Config IE are provided in Appendix B.

As seen in Appendix B, the PDSCH-ConfigDedicated information element is amended to include a $\Delta_P$ value which is an integer from 0 to 7. Further, the PDSCH-Config field descriptions are amended to include a $\Delta_P$ value.

In some approaches, instead of $\Delta_P$ being provided, the $\rho'_A$ and $\rho'_B$ may instead be provided to a UE. The setting for $\rho'_A$ can be based on a required range for ABS downlink transmission power. In this case, one example change for existing PDSCH-Config IEs is shown in Appendix C below.

As seen in Appendix C, the PDSCH-ConfigCommon IE is amended to include a p-b-prime value which is an integer from 0-7 and the PDSCH-ConfigDedicated IE is amended to include a p-a-prime value which is an enumerated value.

Further, as seen in Appendix C, the PDSCH-Config field descriptions also may be amended to include the p-b-prime value and p-a-prime values.

Figure 5:
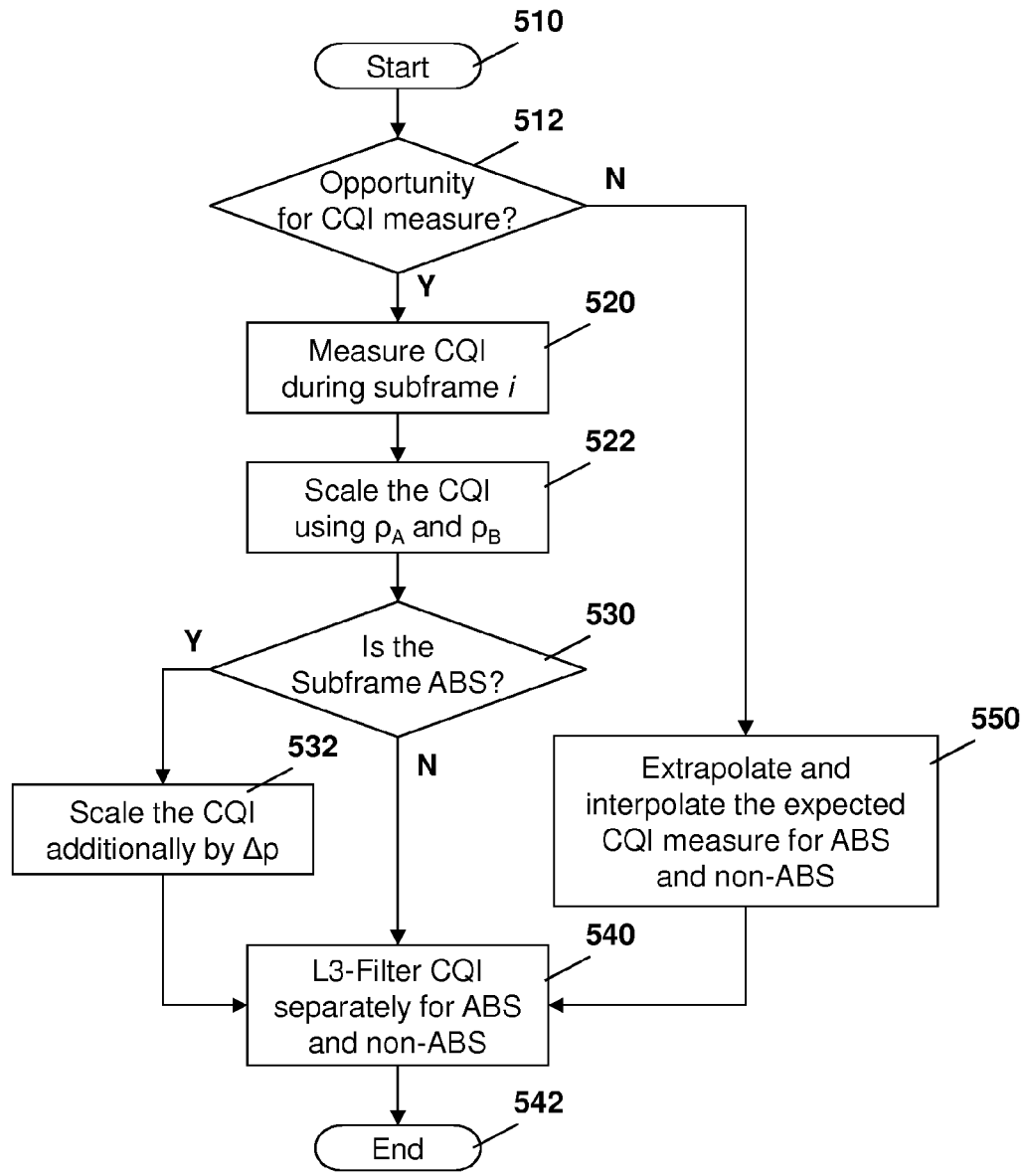
FIG. 5 is process diagram showing the application of a power offset value to a CQI measurement for an almost blank subframe.

Reference is now made to FIG. 5, which illustrates an example flow diagram illustrating the scaling of the CQI value. In particular, the process of FIG. 5 starts at block 510 and proceeds to block 512 in which a check is made to determine whether the opportunity exists for the CQI measurement. If yes, the process then proceeds to block 520 in which a CQI measurement is made during subframe i.

The process then proceeds from block 520 to block 522, in which the measured CQI is scaled with the $\rho_A$ and $\rho_B$ values received at the UE.

The process then proceeds to block 530 to check whether or not the subframe is an ABS subframe. If the subframe is an ABS subframe, the process proceeds to block 532 in which the CQI is additionally scaled by $\Delta_P$. As provided in the present disclosure, the $\Delta_P$ value may be received through a broadcast message or dedicated RRC signalling, for example. Further, block 532 could be configured to use a $\rho'_A$ and $\rho'_B$ value instead of the $\Delta_P$ value.

From block 530, if the subframe is not an ABS subframe, or from block 532, the process proceeds to block 540 in which the L3-Filter for the CQI is applied separately for ABS and non-ABS subframes. As will be appreciated, this may be the application of equation 3 above to the CQI.

From block 540 the process proceeds to block 542 and ends.

If, at block 512, the opportunity does not exist for a CQI measure, the process proceeds from block 512 to block 550 in which the UE may extrapolate or interpolate the expected CQI measure for non-ABS and ABS subframes. The extrapolated or interpolated CQI measures are then provided to block 540, which may then produce the L3-Filter on these values. The process then proceeds to block 542 and ends.

Thus, in accordance with the example process of FIG. 5, the UE may provide a separate CQI value for ABS and non-ABS subframes in accordance with a $\Delta_P$ value or a $\rho'_A$ and $\rho'_B$ value received at the UE.

Detection of ABS and Non-ABS at the UE

In one approach of the present disclosure, a UE may detect whether or not the subframe it is measuring is an ABS or a non-ABS subframe. In particular, UEs connected to aggressor and victim cells can autonomously distinguish the ABS subframes from non-ABS subframes by measuring their signal power from the respective serving cells. The received signal strength can be compared to a cell specific threshold value to decide the status of the subframe. The cell specific threshold value may, for example, be provided over a system information block.

In one approach, a UE may be connected to an aggressor cell. In this case, the autonomous detection of the ABS and non-ABS subframes may be accomplished in accordance with the following.

As indicated above, a UE connected to an aggressor cell measures CQI separately over ABS and non-ABS subframes from the serving cell of the UE. In one approach, this is performed by measuring the received signal level measured during the RSRE transmission within each subframe separately.

For example, if a UE is connected to a macro cell, a comparison may be made to determine whether the signal power for the RSRE divided by the signal power for data resource element is greater than a threshold. In particular, reference is now made to equation 6.

$$\frac{\zeta_{Ri}}{\zeta_{Di}} > \eta_S \quad (6)$$

Referring to equation 6 above, at subframe i, the subframe is classified as ABS if the ratio of the average transmit power of the RS RE exceeds the average transmit power of the data RE by a threshold. Otherwise, the subframe is classified as non-ABS. In equation 6 above, $\zeta_{Ri}$ and $\zeta_{Di}$ are the average estimated received power from the serving aggressor cell measured over the RSREs and the data REs in the ith subframe respectively. The measurement is only performed over the PDSCH region of the subframe.

In one approach the threshold $\eta_S$ is a UE specific implementation threshold, which can be set by a UE having knowledge of $\Delta_P$.

In accordance with one approach, the threshold value, $\eta_S$ may be provided in a PDSCH Config information element and in particular as part of the PDSCH-ConfigCommon.

Reference is now made to Appendix D. As seen in the Appendix, the PDSCH-Config information element has been modified in accordance with the bold values which show both the delta-p and the eta-S values being provided as an integer value between 0 and 7. These integer values can then be mapped to a table to provide a more specific value. Further, as seen in Appendix D, the delta-p parameter and the eta-S parameter are defined.

Figure 6:
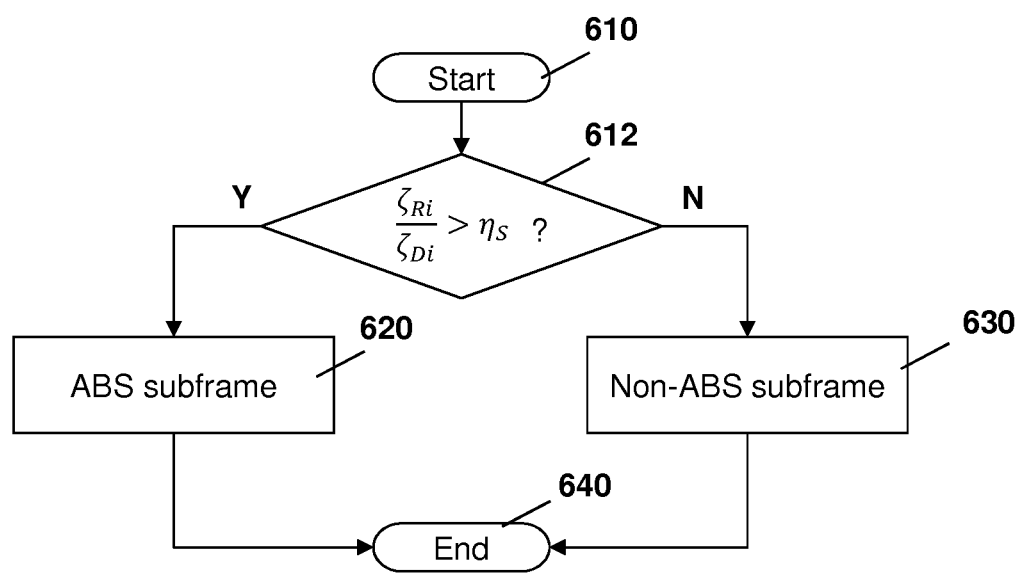
FIG. 6 is process diagram showing the determination of an almost blank subframe at a user equipment connected to an aggressor cell.

Reference is now made to FIG. 6. The process of FIG. 6 starts at block 610 and proceeds to block 612 in which a check is made to determine whether or not the average estimated received power of the reference symbol, over the average estimated received power of the data RE, is greater than the threshold. If yes, the process proceeds to block 620 in which it is determined that the subframe is an ABS subframe. If the check at block 612 determines that the threshold is not exceeded then the process proceeds to block 630 in which it is determined that the subframe is a non-ABS subframe.

From blocks 620 and 630 the process proceeds to block 640 and ends.

Victim Cell UE

The present disclosure also provides that a UE connected to a victim cells may provide separate CQI reports during the ABS and non-ABS subframes of an aggressor cell.

The measurement of the CQI separately over subframes which coincide with the ABS and the non-ABS subframes from an aggressor cell may be performed by measuring inter-cell interference levels during the RSRE transmission within each subframe separately.

Thus, if the UE is connected to the victim cell, and if subframe (i−1) is a non-ABS subframe, then subframe i may be classified as ABS if:

$$v_i < v_{i-1} - \eta_I \quad (7)$$

Otherwise subframe i is classified as non-ABS.

In equation 7 above, $v_i$ is the average estimated inter-cell interference power measured over the RSREs in the ith subframe. Thus, in accordance with the formula, the inter-cell interference power measured at the ith subframe is less than the inter-cell interference power measured at the previous subframe (which is a non-ABS subframe) minus a threshold value, then subframe i is classified as ABS. The measurements are only performed over the PDSCH region of the subframe.

Similarly, if subframe (i−1) is a ABS subframe, then subframe i may be classified as non-ABS if:

$$v_i > v_{i-1} + \eta_I \quad (8)$$

Otherwise subframe i is classified as ABS.

$\eta_I$ is a UE specific implementation threshold, and in some approaches may be set by a UE. However, it may be difficult for a UE to set the threshold, $\eta_I$, without knowledge of whether the ABS is enabled at a nearby macro cell or not. Further, if the ABS pattern is enabled, knowledge of specific values assigned for $\Delta_P$ or $\rho'_A$ and $\rho'_B$ for the ABS specific downlink power allocation simplifies determination for an appropriate value of $\eta_I$.

In one approach, the victim cell may inform the range expansion value to the surrounding cells. Aggressor cells in the vicinity of a pico cell, for example, may determine the appropriate values for $\Delta_P$ or $\rho_A'$ and $\rho'_B$ for the ABS specific downlink power allocation. These values may depend on range expansion values set for a pico cell. Normally, range expansion values are decided based on load balancing across the network.

An aggressor cell such as a macro cell may inform the determined values to surrounding cells. Surrounding pico cells may either broadcast these values to the UEs, or alternatively may determine an appropriate value of $\eta_I$ and broadcast the value over a system information block. A UE's battery power may be saved if $\eta_I$ is broadcast by a victim cell.

If the $\eta_I$ values are broadcast, the value may be broadcast over a PDSCH-Config IE element. One example of a PDSCH-Config information element is provided with regard to Appendix E. In particular, as seen in Appendix E, the PDSCH-ConfigCommon information element is modified with the addition of both the $\Delta_P$ value and either one of the eta-S or eta-I value, depending on the type of cell that the UE is connected to. The eta-S or eta-I values are defined in the PDSCH-Config field descriptions, as shown in Appendix E.

Figure 7:
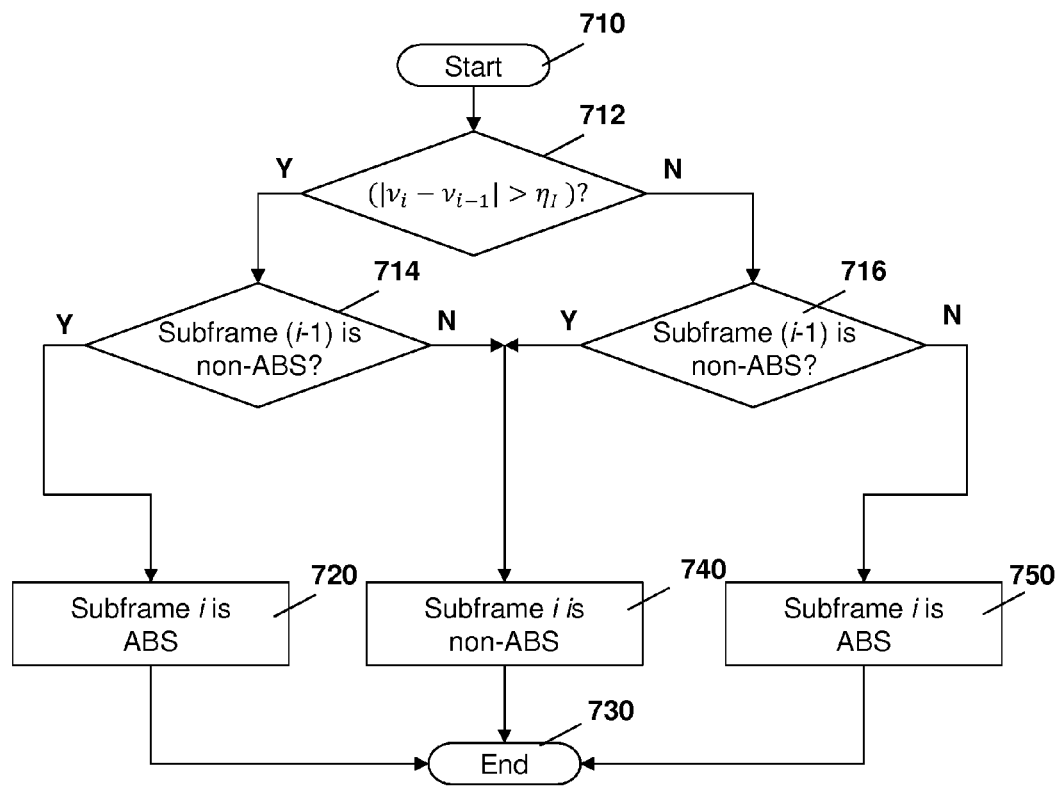
FIG. 7 is process diagram showing the determination of an almost blank subframe at a user equipment connected to a victim cell.

Reference is now made to FIG. 7, which shows a process for determining whether or not a UE connected to a victim cell is measuring a CQI value corresponding with an ABS subframe or a non-ABS subframe from the aggressor cell. The process of FIG. 7 starts at block 710 and proceeds to block 712 in which a check is made to determine whether an absolute value of the difference of the estimated inter cell interference power measured over the RSREs in the current subframe and the previous subframe is greater than a threshold. If yes, the process proceeds to block 714 in which a check is made to determine whether the previous subframe is non-ABS.

From block 714, if the previous subframe is non-ABS the process proceeds to block 720 in which it is determined that the current subframe is ABS. The process then proceeds to block 730 and ends.

Conversely, from block 714 if it is determined that the previous subframe is ABS, the process proceeds to block 740 in which it is determined that the current subframe is non-ABS. The process then proceeds to block 730 and ends.

From block 712, if it is determined that the estimated inter cell power level difference between the current and the previous subframes does not exceed a threshold, the process proceeds to block 716. At block 716 a check is made to determine whether the previous subframe is non-ABS. If yes, the process proceeds to block 740 in which it is determined that the current subframe is also non-ABS. The process then proceeds to block 730 and ends.

From block 716, if it is determined that the previous subframe is ABS, then the process proceeds to block 750 in which it is determined that the current subframe is also ABS. The process then proceeds to block 730 and ends.

Coordination Between Cells

In a further approach, a range expansion value configured at a low power node can be sent to a macro cell over an X2AP interface. The macro cell can decide an appropriate value for the ABS transmission power and inform the low power node. This coordination allows the avoidance of inter-cell interference and also enables load balancing across a network.

Thus, in accordance with the above, the aggressor and victim cells can exchange system parameters to allow appropriate parameters to be transmitted to the UEs.

Figure 8:
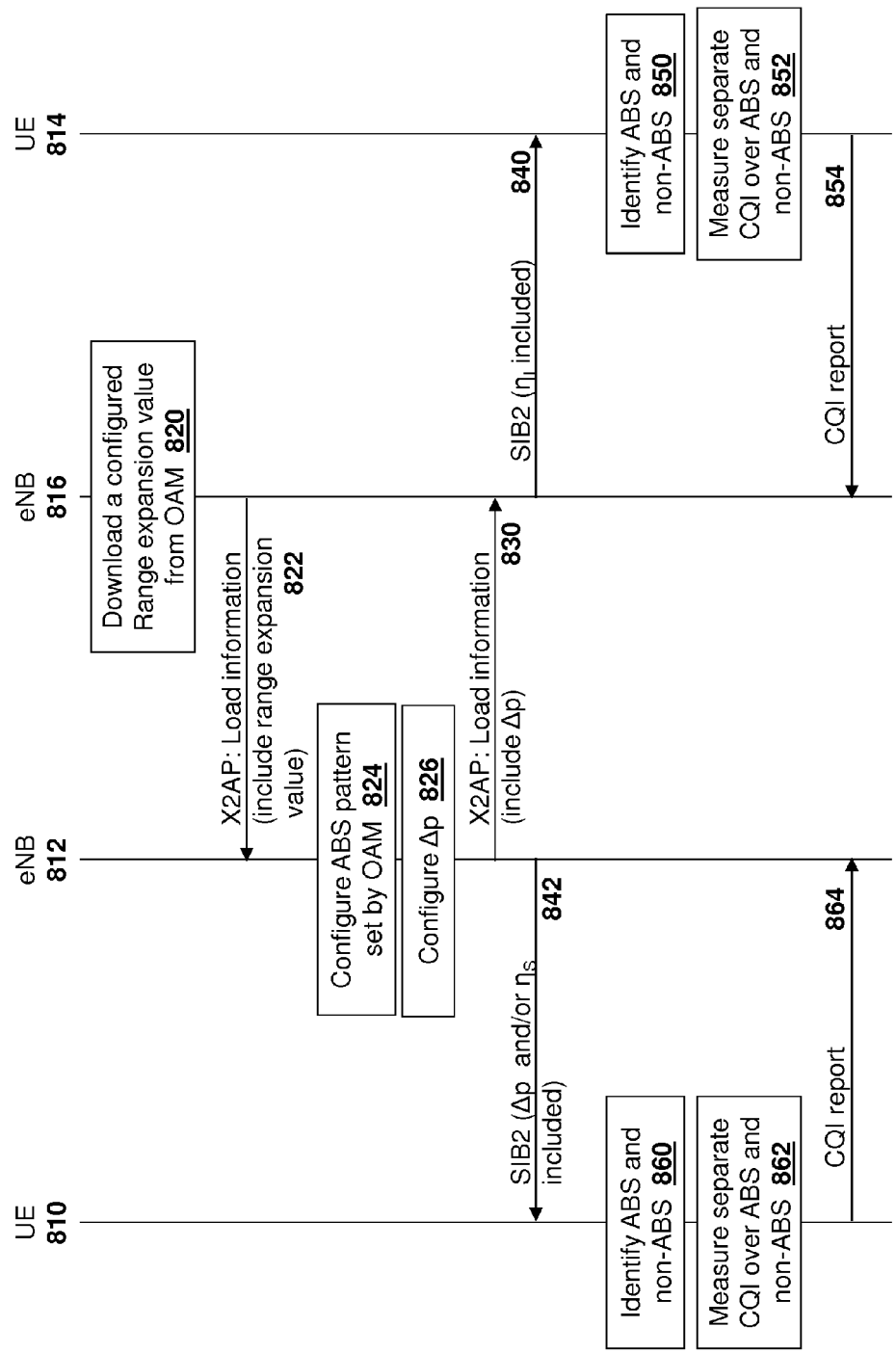
FIG. 8 is a data flow diagram showing network element coordination for separate channel quality indicator reporting for almost blank subframes and non-almost blank subframes.

Reference is now made to FIG. 8. In FIG. 8, a first UE 810 is a macro UE, for example, and communicates with a macro eNB 812.

Further, a second UE 814 may be a pico UE and communicates with pico eNB 816. The use of macro and pico is merely meant as an example and the eNB 812 may be considered to be an aggressor eNB and eNB 816 may be considered to be a victim eNB in some approaches.

As seen in FIG. 8, at block 820 the pico eNB 816 obtains a range expansion parameter from the operation administration and maintenance (OAM), along with all network performance parameters controlled by the network operator. Range expansion parameters may depend on various factors such as load balancing requirements set by the operator, the geographic location of other cells and their corresponding coverage or transmit powers, among other factors.

Pico eNB 816 then provides macro eNB 812 with load information included range expansion values over the X2AP backhaul. As will be appreciated by those in the art, the load information may be provided to all macro cells surrounding the pico cell 816. The transmission of the load information is shown in FIG. 8 by arrow 822.

Macro eNB 812 then configures the ABS pattern set by the OAM, as shown by block 824.

Macro eNB 812 then may configure the $\Delta_P$ value based on the range expansion parameter received from pico eNB 816 and from other pico eNBs in its vicinity, as shown by block 826. The parameter may be adjusted on the performance feedback from attached UEs over time. Further, the macro eNB 812 can set the parameter more accurately if the location of the pico cell relative to the location of the macro cell is known at the macro eNB 812.

Macro eNB 812 then provides pico eNB 816 with the load information including the $\Delta_P$ value, as shown by arrow 830.

Based on the $\Delta_P$ value, the $\eta_S$ and $\eta_I$ values may be calculated and the pico cell 816 may provide a system information block message, as shown by arrow 840 to UE 814, where the message includes the $\eta_I$ value.

Further, macro eNB 812 may provide a system information block to UE 810 that includes the $\Delta_P$ parameter, shown by arrow 842. In some approaches, the $\eta_S$ parameter may also be provided by macro eNB 812 to UE 810.

On receipt of the message of arrow 840, UE 814 identifies the ABS and non-ABS subframes in accordance with equation 7 and FIG. 7 above. This is shown by block 850. Further, the macro UE 814 can then measure the separate CQI over ABS and non-ABS subframes as shown by block 852 and provide a CQI report as shown by arrow 854.

Similarly, UE 810 receives the system information block with the $\Delta_P$ and potentially the $\eta_S$ values. The UE 810 then identifies the ABS and non-ABS subframes in accordance with equation 6 and FIG. 6 above, as shown by block 860.

The UE 810 then performs a separate CQI measurement over the ABS and non-ABS subframes, as shown by block 862 and provides a CQI report back to macro cell 812, as shown by arrow 864.

In accordance with the above, the relative narrow band transmit power (RNTP) information element as part of the X2AP: Load information message may be modified to allow for the passing of the $\Delta_P$ value in the message of arrow 830. One such example is provided below with regard to Appendix F.

As seen in Appendix F, the RNTP information element is expanded to include the $\Delta_P$ value which may be an integer and defined as an optional element.

The above may be implemented by any network element. A simplified network element is shown with regard to FIG. 9. The network element of FIG. 9 may be eNB 120, 132, 142, 210, 220, 310, 320, 812 or 816, among others.

Figure 9:
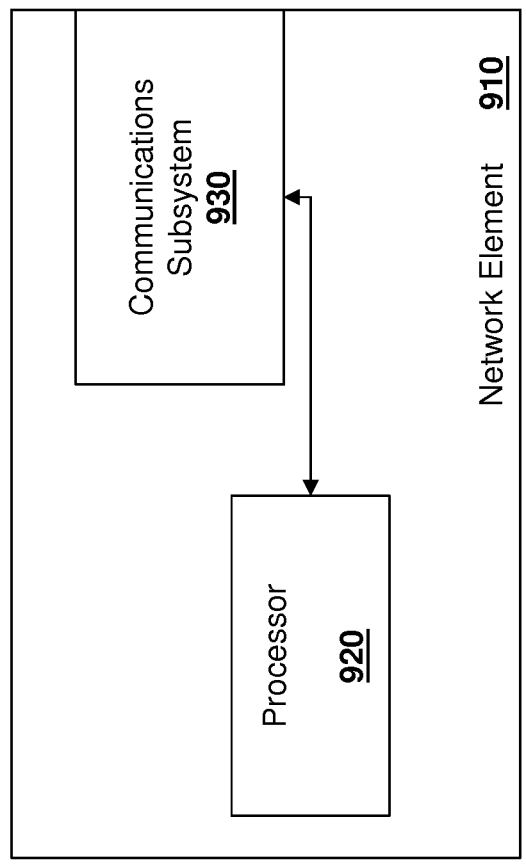
FIG. 9 is a simplified block diagram of a network element capable of being used with the approaches of the present disclosure.

In FIG. 9, network element 910 includes a processor 920 and a communications subsystem 930, where the processor 920 and communications subsystem 930 cooperate to perform the methods described above.

Further, the above may be implemented by any UE. One exemplary device is described below with regard to FIG. 10.

UE 1000 is typically a two-way wireless communication device having voice and data communication capabilities. UE 1000 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1000 is enabled for two-way communication, it may incorporate a communication subsystem 1011, including both a receiver 1012 and a transmitter 1014, as well as associated components such as one or more antenna elements 1016 and 1018, local oscillators (LOs) 1013, and a processing module such as a digital signal processor (DSP) 1020. As will be apparent to those skilled in the field of communications, the particular design of the communication subsystem 1011 will be dependent upon the communication network in which the device is intended to operate. The radio frequency front end of communication subsystem 1011 can be any of the approaches described above.

Network access requirements will also vary depending upon the type of network 1019. In some networks network access is associated with a subscriber or user of UE 1000. A UE may require a removable user identity module (RUIM) or a subscriber identity module (SIM) card in order to operate on a CDMA network. The SIM/RUIM interface 1044 is normally similar to a card-slot into which a SIM/RUIM card can be inserted and ejected. The SIM/RUIM card can have memory and hold many key configurations 1051, and other information 1053 such as identification, and subscriber related information.

Figure 10:
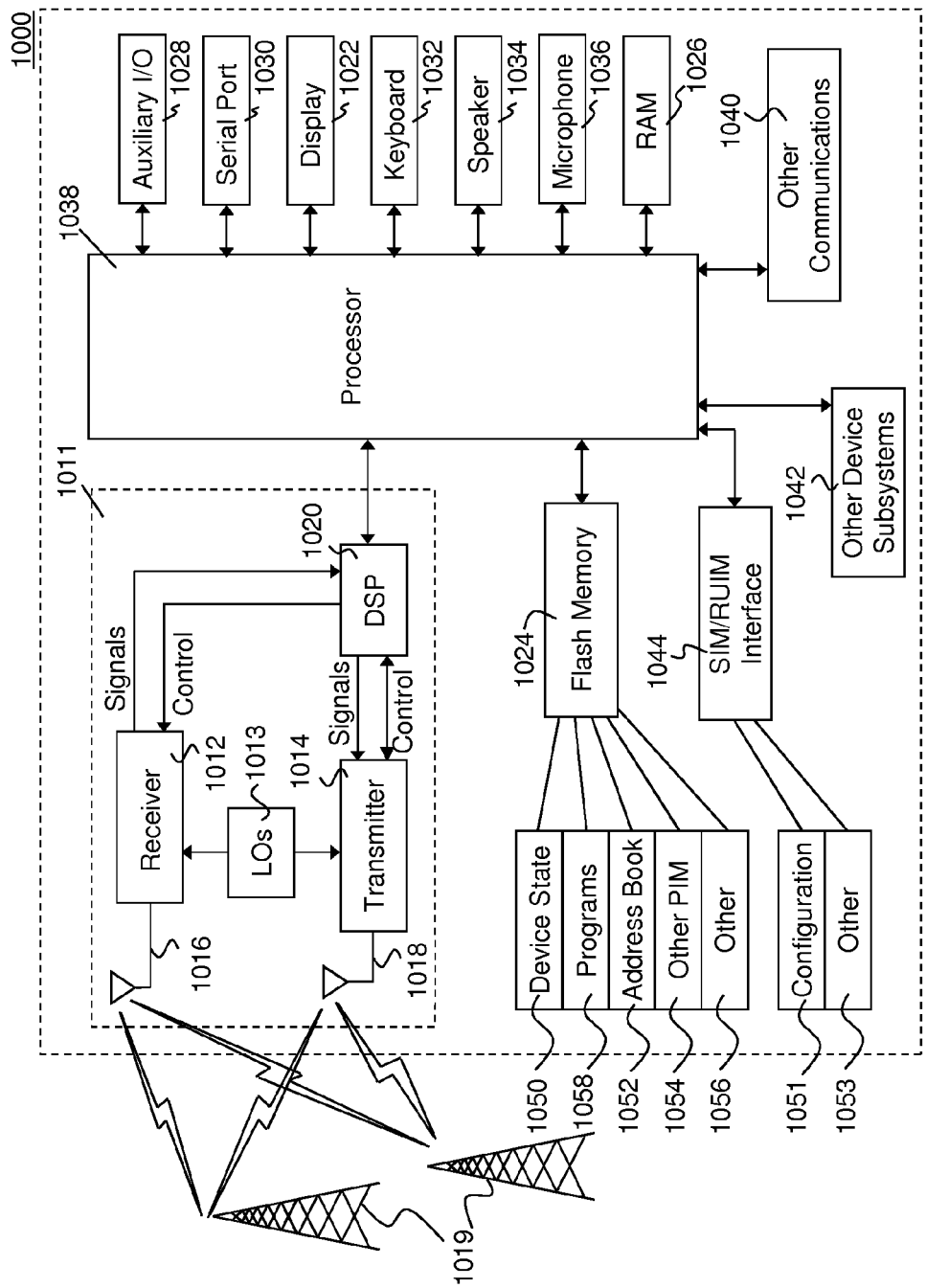
FIG. 10 is a block diagram of an example mobile device.

When required network registration or activation procedures have been completed, UE 1000 may send and receive communication signals over the network 1019. As illustrated in FIG. 10, network 1019 can consist of multiple base stations communicating with the UE.

Signals received by antenna 1016 through communication network 1019 are input to receiver 1012, which may perform such common receiver functions as signal amplification, frequency down conversion, filtering, channel selection and the like. A/D conversion of a received signal allows more complex communication functions such as demodulation and decoding to be performed in the DSP 1020. In a similar manner, signals to be transmitted are processed, including modulation and encoding for example, by DSP 1020 and input to transmitter 1014 for digital to analog conversion, frequency up conversion, filtering, amplification and transmission over the communication network 1019 via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

UE 1000 generally includes a processor 1038 which controls the overall operation of the device. Communication functions, including data and voice communications, are performed through communication subsystem 1011. Processor 1038 also interacts with further device subsystems such as the display 1022, flash memory 1024, random access memory (RAM) 1026, auxiliary input/output (I/O) subsystems 1028, serial port 1030, one or more keyboards or keypads 1032, speaker 1034, microphone 1036, other communication subsystem 1040 such as a short-range communications subsystem and any other device subsystems generally designated as 1042. Serial port 1030 could include a USB port or other port known to those in the art.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list.

Operating system software used by the processor 1038 may be stored in a persistent store such as flash memory 1024, which may instead be a read-only memory (ROM) or similar storage element (not shown). Those skilled in the art will appreciate that the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. Processor 1038, in addition to its operating system functions, may enable execution of software applications on the UE. A predetermined set of applications that control basic operations, including at least data and voice communication applications for example, will normally be installed on UE 1000 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1019. Further applications may also be loaded onto the UE 1000 through the network 1019, an auxiliary I/O subsystem 1028, serial port 1030, short-range communications subsystem 1040 or any other suitable subsystem 1042, and installed by a user in the RAM 1026 or a non-volatile store (not shown) for execution by the processor 1038. Such flexibility in application installation increases the functionality of the device and may provide enhanced on-device functions, communication-related functions, or both. For example, secure communication applications may enable electronic commerce functions and other such financial transactions to be performed using the UE 1000.

In a data communication mode, a received signal such as a text message or web page download will be processed by the communication subsystem 1011 and input to the processor 1038, which may further process the received signal for output to the display 1022, or alternatively to an auxiliary I/O device 1028.

A user of UE 1000 may also compose data items such as email messages for example, using the keyboard 1032, which may be a complete alphanumeric keyboard or telephone-type keypad, among others, in conjunction with the display 1022 and possibly an auxiliary I/O device 1028. Such composed items may then be transmitted over a communication network through the communication subsystem 1011.

For voice communications, overall operation of UE 1000 is similar, except that received signals would typically be output to a speaker 1034 and signals for transmission would be generated by a microphone 1036. Alternative voice or audio I/O subsystems, such as a voice message recording subsystem, may also be implemented on UE 1000. Although voice or audio signal output is preferably accomplished primarily through the speaker 1034, display 1022 may also be used to provide an indication of the identity of a calling party, the duration of a voice call, or other voice call related information for example.

Serial port 1030 in FIG. 10 would normally be implemented in a personal digital assistant (PDA)-type UE for which synchronization with a user's desktop computer (not shown) may be desirable, but is an optional device component. Such a port 1030 would enable a user to set preferences through an external device or software application and would extend the capabilities of UE 1000 by providing for information or software downloads to UE 1000 other than through a wireless communication network. The alternate download path may for example be used to load an encryption key onto the device through a direct and thus reliable and trusted connection to thereby enable secure device communication. As will be appreciated by those skilled in the art, serial port 1030 can further be used to connect the UE to a computer to act as a modem.

Other communications subsystems 1040, such as a short-range communications subsystem, is a further optional component which may provide for communication between UE 1000 and different systems or devices, which need not necessarily be similar devices. For example, the subsystem 1040 may include an infrared device and associated circuits and components or a Bluetooth™ communication module to provide for communication with similarly enabled systems and devices. Subsystem 1040 may further include non-cellular communications such as WiFi or WiMAX.

The approaches described herein are examples of structures, systems or methods having elements corresponding to elements of the techniques of this application. This written description may enable those skilled in the art to make and use approaches having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

APPENDIX A

PDSCH-Config

-- ASN1START
```
PDSCH-ConfigCommon ::=    SEQUENCE {
   referenceSignalPower      INTEGER (-60..50),
   p-b                       INTEGER (0..3)
   delta-P                   INTEGER (0..7)
}
PDSCH-ConfigDedicated::=   SEQUENCE {
   p-a                       ENUMERATED {
                                dB-6, dB-4dot77, dB-3, dB-1dot77,
                                dB0, dB1, dB2, dB3}
}
```
-- ASN1STOP PDSCH-Config field descriptions p-a
Parameter: $P_A$, see TS 36.213 [23, 5.2]. Value dB-6 corresponds to −6 dB, dB-4dot77 corresponds to −4.77 dB etc.
p-b
Parameter: $P_B$, see TS 36.213 [23. Table 5.2-1].
referenceSignalPower
Parameter: Reference-signal power, which provides the downlink reference-signal EPRE, see TS 36.213 [23, 5.2]. The actual value in dBm.
delta-P
Parameter: $\Delta_P$, see TS 36.213 [23].

APPENDIX B

PDSCH-Config

-- ASN1START
```
PDSCH-ConfigCommon ::=    SEQUENCE {
   referenceSignalPower      INTEGER (-60..50),
   p-b                       INTEGER (0..3)
}
PDSCH-ConfigDedicated::=   SEQUENCE {
   p-a                       ENUMERATED {
                                dB-6, dB-4dot77, dB-3, dB-1dot77,
                                dB0, dB1, dB2, dB3}
   delta-P                   INTEGER (0..7)
}
```
-- ASN1STOP PDSCH-Config field descriptions p-a
Parameter: $P_A$, see TS 36.213 [23, 5.2]. Value dB-6 corresponds to −6 dB, dB-4dot77 corresponds to −4.77 dB etc.
p-b
Parameter: $P_B$, see TS 36.213 [23, Table 5.2-1].
referenceSignalPower
Parameter: Reference-signal power, which provides the downlink reference-signal EPRE, see TS 36.213 [23, 5.2], The actual value in dBm.
delta-P
Parameter: $\Delta_P$, see TS 36.213 [23].

APPENDIX C

PDSCH-Config

-- ASN1START
```
PDSCH-ConfigCommon ::=    SEQUENCE {
   referenceSignalPower      INTEGER (-60..50),
   p-b                       INTEGER (0..3)
   p-b-prime                 INTEGER (0..7)
}
PDSCH-ConfigDedicated::=   SEQUENCE {
   p-a                       ENUMERATED {
                                dB-6, dB-4dot77, dB-3, dB-1dot77,
                                dB0, dB1, dB2, dB31
   p-a-prime                 ENUMERATED {...}
}
```
-- ASN1STOP PDSCH-Config field descriptions p-a
Parameter: $P_A$, see TS 36.213 [23, 5.2]. Value dB-6 corresponds to −6 dB, dB-4dot77 corresponds to −4.77 dB etc.
p-b
Parameter: $P_B$, see TS 36.213 [23, Table 5.2-1].
referenceSignalPower
Parameter: Reference-signal power, which provides the downlink reference-signal EPRE, see TS 36.213 [23, 5.2]. The actual value in dBm.
p-b-prime
Parameter: $P'_B$, see TS 36.213 [23].
p-a-prime
Parameter: $P'_A$, see TS 36.213 [23].

APPENDIX D

PDSCH-Config

-- ASN1START
```
PDSCH-ConfigCommon ::=    SEQUENCE {
   referenceSignalPower      INTEGER (-60..50),
   p-b                       INTEGER (0..3)
   delta-P                   INTEGER (0..7)
   eta-S                     INTEGER (0..7)
}
PDSCH-ConfigDedicated::=   SEQUENCE {
   p-a                       ENUMERATED {
                                dB-6, dB-4dot77, dB-3, dB-1dot77,
                                dB0, dB1, dB2, dB3}
}
```
-- ASN1STOP PDSCH-Config field descriptions p-a
Parameter: $P_A$, see TS 36.213 [23, 5.2]. Value dB-6 corresponds to −6 dB,

APPENDIX D-continued dB-4dot77 corresponds to −4.77 dB etc.
p-b
Parameter: $P_B$, see TS 36.213 [23, Table 5.2-1].
referenceSignalPower
Parameter: Reference-signal power, which provides the downlink reference-signal EPRE, see TS 36.213 [23, 5.2]. The actual value in dBm.
delta-P
Parameter: $\Delta_P$, see TS 36.213 [23].
eta-S

APPENDIX E-continued

Parameter: $P_B$, see TS 36.213 [23, Table 5.2-1].
referenceSignalPower
Parameter: Reference-signal power, which provides the downlink reference-signal EPRE, see TS 36.213 [23, 5.2]. The actual value in dBm.
delta-P
Parameter: $\Delta_P$, see TS 36.213 [23].
eta-S
Parameter: $\eta_S$, see TS 36.213 [23].
eta-I
Parameter: $\eta_I$, see TS 36.213 [23].

APPENDIX F

| IE/Group | Presence | Range IE type and | Semantics description | Criticality | Assigned |
|---|---|---|---|---|---|
| RNTP Per PRB | M | BIT STRING (6 ... 110, ...) | Each position in the bitmap represents a $n_{PRB}$ value (i.e. first bit = PRB 0 and so on), for which the bit value represents RNTP ($n_{PRB}$), defined in [11]. Value 0 indicates "Tx not exceeding RNTP threshold". Value 1 indicates "no promise on the Tx power is given" | — | — |
| RNTP Threshold | M | ENUMERATED (−∞, −11, −10, −9, −8, −7, −6, −5, −4, −3, −2, −1, 0, 1, 2, 3, ...) | $RNTP_{threshold}$ is defined in [11] | — | — |
| Number Of Cell-specific Antenna Ports | M | ENUMERATED (1, 2, 4, ...) | P (number of antenna ports for cell-specific reference signals) defined in [10] | — | — |
| P_B | M | INTEGER (0 ... 3, ...) | $P_B$ is defined in [11] | — | — |
| $\Delta_p$ | O | INTEGER | $\Delta_p$ is defind in [11] | — | — |
| PDCCH Interference Impact | M | INTEGER (0 ... 4, ...) | Measured by Predicted Number Of Occupied PDCCH OFDM Symbols (see [10]). Value 0 means "no prediction is available" | — | — |

APPENDIX D-continued

Parameter: $\eta_S$, see TS 36.213 [23].

APPENDIX E

PDSCH-Config

```
-- ASN1START
PDSCH-ConfigCommon ::=    SEQUENCE {
    referenceSignalPower      INTEGER (−60..50),
    p-b                       INTEGER (0..3)
    delta-P                   INTEGER (0..7)
    eta-S / eta-I             INTEGER (0..7)
}
PDSCH-ConfigDedicated::=  SEQUENCE {
    p-a                       ENUMERATED {
                                dB-6, dB-4dot77, dB-3, dB-1dot77,
                                dB0, dB1, dB2, dB3}
}
-- ASN1STOP
```

PDSCH-Config field descriptions p-a
Parameter: $P_A$, see TS 36.213 [23, 5.2]. Value dB-6 corresponds to −6 dB, dB-4dot77 corresponds to −4.77 dB etc.
p-b

The invention claimed is:

1. A method for providing channel quality indicator feedback from a user equipment, comprising:
   receiving, at the user equipment, a power offset value;
   measuring, at the user equipment, a channel quality indicator over a reference symbol resource element; and
   scaling, at the user equipment, the channel quality indicator using the power offset value during an almost blank subframe.

2. The method of claim 1, wherein the receiving is over a broadcast channel.

3. The method of claim 1, wherein the receiving is over dedicated radio resource control signaling.

4. The method of claim 1, wherein the receiving obtains an integer value, the integer value mapping to a power offset value.

5. The method of claim 1, wherein the receiving obtains the power offset value in combination with a transmit power scaling factor.

6. A user equipment for providing channel quality indicator feedback, comprising:
   a processor; and
   a communications subsystem,
   wherein the processor and communications subsystem are configured to:

receive a power offset value;
measure a channel quality indicator over a reference symbol resource element; and
scale the channel quality indicator using the power offset value during an almost blank subframe.

7. The user equipment of claim 6, wherein the processor and communications subsystem are configured to receive over a broadcast channel.

8. The user equipment of claim 6, wherein the processor and communications subsystem are configured to receive over dedicated radio resource control signaling.

9. The user equipment of claim 6, wherein the processor and communications subsystem are configured to receive by obtaining an integer value, the integer value mapping to a power offset value.

10. The user equipment of claim 6, wherein the processor and communications subsystem are configured to receive by obtaining the power offset value in combination with a transmit power scaling factor.

11. A method for determining an almost blank subframe at a user equipment connected to an aggressor cell, the method comprising:
receiving, at the user equipment, a threshold value; and
determining the almost blank subframe based on a comparison of the threshold value with a ratio of an average estimated received power from the aggressor cell for a reference symbol resource element and the average estimated received power from the aggressor cell for a data resource element.

12. The method of claim 11, wherein the threshold value is received over a broadcast channel.

13. The method of claim 11, wherein the threshold value is received over dedicated radio resource control signaling.

14. A user equipment connected to an aggressor cell for determining an almost blank subframe, comprising:
a processor; and
a communications subsystem,
wherein the processor and communications subsystem are configured to:
receive a threshold value; and
determine the almost blank subframe based on a comparison of the threshold value with a ratio of an average estimated received power from the aggressor cell for a reference symbol resource element and the average estimated received power from the aggressor cell for a data resource element.

15. The user equipment of claim 14, wherein the threshold value is received over a broadcast channel.

16. The user equipment of claim 14, wherein the threshold value is received over dedicated radio resource control signaling.

17. A method for determining an almost blank subframe of an aggressor cell at a user equipment connected to a victim cell, the method comprising:
receiving, at the user equipment, a threshold value;
measuring the average inter-cell interference level over a subframe; and
determining the almost blank subframe (ABS) based on a comparison of the threshold value with an absolute difference between an average estimated inter-cell interference power measured over the reference symbol resource element in a subframe and the average estimated inter-cell interference power measured over the reference symbol resource element in a previous subframe.

18. The method of claim 17, wherein the threshold value is received over a broadcast channel.

19. The method of claim 17, wherein the threshold value is received over dedicated radio resource control signaling.

20. The method of claim 17, wherein a subframe is decided as ABS if the absolute difference of the interference power levels observed over the current and the previous subframes is above the threshold value and the previous subframe is not ABS.

21. The method of claim 17, wherein a subframe is decided as ABS if the absolute difference of the interference power levels observed over the current and the previous subframes is less than the threshold value and the previous subframe is ABS.

22. A user equipment connected to a victim cell for determining an almost blank subframe of an aggressor cell, comprising:
a processor; and
a communications subsystem,
wherein the processor and communications subsystem are configured to:
receive a threshold value;
measure the average inter-cell interference level over a subframe; and
determine the almost blank subframe (ABS) based on a comparison of the threshold value with an absolute difference between an average estimated inter-cell interference power measured over the reference symbol resource element in a subframe and the average estimated inter-cell interference power measured over the reference symbol resource element in a previous subframe.

23. The user equipment of claim 22, wherein the threshold value is received over a broadcast channel.

24. The user equipment of claim 22, wherein the threshold value is received over dedicated radio resource control signaling.

25. The user equipment of claim 22, wherein a subframe is decided as ABS if the absolute difference of the interference power levels observed over the current and the previous subframes is above the threshold value and the previous subframe is not ABS.

26. The user equipment of claim 22, wherein a subframe is decided as ABS if the absolute difference of the interference power levels observed over the current and the previous subframes is less than the threshold value and the previous subframe is ABS.

* * * * *